United States Patent
Kirchmair et al.

(10) Patent No.: US 8,757,736 B2
(45) Date of Patent: Jun. 24, 2014

(54) SNOW GROOMER TRACK AND SNOW GROOMER FEATURING SUCH A TRACK

(75) Inventors: Martin Kirchmair, Pfons (AT); Volker Pahl, Vintl (IT)

(73) Assignee: Snowgrolic S. AR. L., Luxembourg (LU)

( * ) Notice: Subject to any disclaimer, the term of this patent is extended or adjusted under 35 U.S.C. 154(b) by 799 days.

(21) Appl. No.: 12/994,618

(22) PCT Filed: May 28, 2009

(86) PCT No.: PCT/EP2009/056582
§ 371 (c)(1), (2), (4) Date: Feb. 28, 2011

(87) PCT Pub. No.: WO2009/144291
PCT Pub. Date: Dec. 3, 2009

(65) Prior Publication Data
US 2011/0163595 A1 Jul. 7, 2011

(30) Foreign Application Priority Data
May 29, 2008 (IT) .............................. MI2008A1001

(51) Int. Cl.
*B62D 55/26* (2006.01)
(52) U.S. Cl.
USPC .......................................................... 305/46
(58) Field of Classification Search
USPC ........... 305/46, 180, 181, 187, 191, 192, 195, 305/196
See application file for complete search history.

(56) References Cited

U.S. PATENT DOCUMENTS

| | | | |
|---|---|---|---|
| 3,170,533 A | 2/1965 | Fewel et al. | |
| 3,227,295 A | 1/1966 | Hamilton et al. | |
| 3,386,778 A | 6/1968 | Rymes | |
| 3,534,701 A | 10/1970 | Hebert | |
| 3,692,132 A | 9/1972 | Pollanen | |
| 3,763,944 A | 10/1973 | Kaltenegger | |
| 4,087,135 A | 5/1978 | Unruh | |
| 4,348,825 A | 9/1982 | Bachler | |
| 4,452,495 A * | 6/1984 | Orlandea | 305/196 |
| 4,458,954 A | 7/1984 | Haas | |

(Continued)

FOREIGN PATENT DOCUMENTS

| | | |
|---|---|---|
| CA | 2211050 | 1/1998 |
| CA | 2443765 A1 | 4/2004 |

(Continued)

OTHER PUBLICATIONS

PistenBully 600 brochure, written by Kassbohrer Gelandefahrzeug AG, published in Mar. 2010.

(Continued)

*Primary Examiner* — Joseph Pape
*Assistant Examiner* — Dana Ivey
(74) *Attorney, Agent, or Firm* — Neal, Gerber & Eisenberg LLP

(57) ABSTRACT

A track for a snow groomer having a plurality of grousers spaced apart, extending crosswise to the traveling direction of the track, and each having a grip portion configured to grip the terrain, and a blunt edge opposite the grip portion. A chain is connected to the blunt edges of the grousers so as to be engaged, in use, by a drive sprocket of a snow groomer.

16 Claims, 5 Drawing Sheets

(56) References Cited

U.S. PATENT DOCUMENTS

| | | |
|---|---|---|
| 4,458,955 A | 7/1984 | Webb |
| 4,500,139 A | 2/1985 | Tucek |
| 4,788,783 A | 12/1988 | Bachler |
| 4,815,223 A * | 3/1989 | Brandt ............................ 37/224 |
| 5,062,493 A | 11/1991 | Platter et al. |
| 5,067,263 A | 11/1991 | Pelletier |
| 5,318,141 A | 6/1994 | Hansen |
| 6,155,363 A | 12/2000 | Matsumoto et al. |
| 6,296,330 B1 | 10/2001 | Hall |
| 6,354,023 B1 | 3/2002 | Trahan et al. |
| 6,364,437 B1 | 4/2002 | Phely |
| 6,418,645 B1 | 7/2002 | Hammerle et al. |
| 6,637,134 B2 | 10/2003 | Hammerle |
| 6,810,609 B2 | 11/2004 | Lassonde et al. |
| 6,921,304 B2 | 7/2005 | Hewitt |
| 6,983,927 B2 | 1/2006 | Pelletier et al. |
| 7,464,699 B2 | 12/2008 | Joppig et al. |
| 7,530,547 B2 | 5/2009 | Leitner et al. |
| 2002/0139013 A1 | 10/2002 | Hammerle |
| 2003/0051376 A1 | 3/2003 | Lassonde et al. |
| 2003/0159840 A1 | 8/2003 | Schmidt, Jr. |
| 2004/0069981 A1 | 4/2004 | Pelletier et al. |
| 2005/0252592 A1 | 11/2005 | Albright et al. |
| 2005/0279980 A1 | 12/2005 | Leitner et al. |
| 2007/0130806 A1 | 6/2007 | Goodman |
| 2008/0257616 A1 | 10/2008 | Olsson |
| 2008/0269986 A1 | 10/2008 | Regnell et al. |
| 2008/0309157 A1 | 12/2008 | Runggaldier et al. |
| 2009/0000833 A1 | 1/2009 | Dorais et al. |
| 2009/0007461 A1 | 1/2009 | Pelletier et al. |
| 2009/0013562 A1 | 1/2009 | Pelletier |

FOREIGN PATENT DOCUMENTS

| | | |
|---|---|---|
| DE | 2145772 | 3/1973 |
| DE | 2148304 | 4/1973 |
| DE | 2219623 | 11/1973 |
| DE | 2254276 | 5/1974 |
| DE | 3440491 | 5/1986 |
| DE | 3534626 | 3/1987 |
| DE | 29515866 | 1/1996 |
| DE | 29603251 | 4/1996 |
| DE | 10320523 | 11/2004 |
| EP | 0551160 A1 | 7/1993 |
| EP | 1405782 | 4/2004 |
| EP | 1674382 A1 | 10/2005 |
| EP | 1591350 A2 | 11/2005 |
| EP | 1827954 B1 | 12/2005 |
| EP | 1995159 A1 | 6/2007 |
| EP | 1872683 A1 | 1/2008 |
| EP | 1908673 B1 | 9/2009 |
| EP | 1908672 B1 | 4/2010 |
| FR | 2336292 | 7/1977 |
| FR | 2536437 | 5/1984 |
| FR | 2586727 | 3/1987 |
| GB | 1590358 | 6/1981 |
| JP | 1-144287 | 10/1989 |
| JP | 01144287 | 10/1989 |
| JP | 03182887 | 8/1991 |
| JP | 6-51085 | 7/1994 |
| JP | 6-51086 | 7/1994 |
| JP | 7-508236 | 9/1995 |
| JP | 7237566 | 9/1995 |
| JP | 11-348844 | 12/1999 |
| JP | 2003-182655 | 7/2003 |
| WO | WO 93/17902 | 9/1993 |
| WO | WO2005113322 | 1/2005 |
| WO | WO2005093173 | 10/2005 |
| WO | WO2006069671 | 7/2006 |
| WO | WO2006069682 | 7/2006 |
| WO | WO2008114138 | 9/2008 |
| WO | WO2008155423 | 12/2008 |
| WO | WO2008155425 | 12/2008 |
| WO | WO2009034183 | 3/2009 |
| WO | WO2009034185 | 3/2009 |
| WO | WO2009056576 | 5/2009 |
| WO | WO2009056577 | 5/2009 |
| WO | WO2009056578 | 5/2009 |
| WO | WO2009056579 | 5/2009 |

OTHER PUBLICATIONS

PistenBully Scout brochure, written by Kassbohrer Gelandefahrzeug AG, published in Jan. 2010.

International Search Report for International Application No. PCT/EP2009/056582 dated Aug. 25, 2009.

Written Opinion of the International Searching Authority for International Application No. PCT/EP2009/056582.

Office Action for Japanese Patent Application No. 2011-511015, mailed on Feb. 26, 2013.

* cited by examiner

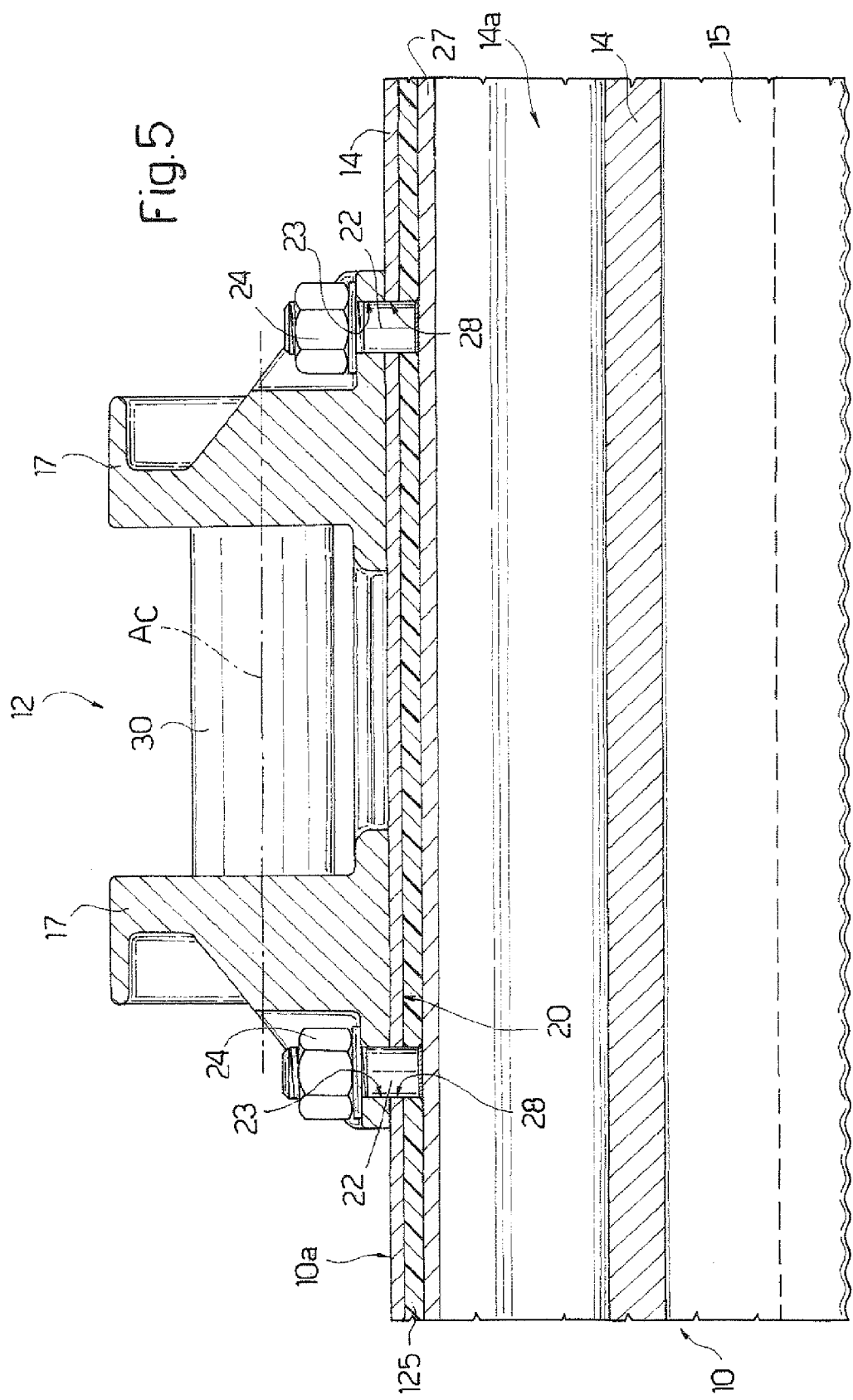

SNOW GROOMER TRACK AND SNOW GROOMER FEATURING SUCH A TRACK

PRIORITY CLAIM

This application is a national stage application of PCT/EP2009/056582, filed on May 28, 2009, which claims the benefit of and priority to Italian Patent Application No. MI2008A 001001, filed on May 29, 2008, the entire contents of which are incorporated herein.

TECHNICAL FIELD

The present disclosure relates to a snow groomer track and a snow groomer.

BACKGROUND

As is known, a snow groomer is a crawler vehicle comprising a frame, to which are connected a shovel (at the front) and a snow grooming implement (at the rear).

Certain known snow groomers normally have two, sometimes four, tracks specially designed for moving over snow. More specifically, certain known snow groomer tracks comprise a number of grousers crosswise to the track traveling direction and connected at the blunt edges by one or more flexible annular belts. The grousers have respective grip portions, opposite the blunt edges, defined by blades which cut into the terrain to move the vehicle forward, and the size of the grousers crosswise to the traveling direction must be considerable, almost equal to the width of the frame, so the vehicle floats over the snow surface. That is, snow groomers frequently operate on deep layers of fresh snow, in which excessive sinking would make it difficult, if not impossible, for the vehicle to move forward; whereas, even on packed snow surfaces, such as used ski slopes, the track prints must be no more than superficial, so they can be removed in one go by the tiller. If the track prints are too deep, this could result in an uneven groomed snow surface, thus endangering users.

The tracks of these known snow groomers are driven by respective drive sprockets on the vehicle, which directly engage the gaps between adjacent grousers; and normally idle guide wheels support the track in the work configuration, by providing the necessary tension, and normally rest on one of the flexible belts.

Such known tracks have a number of drawbacks, mainly due to the drive sprockets working directly on the grousers. Foremost of these is poor traction, on account of the primary function of the grousers being that of gripping the terrain and enabling the vehicle to float. On the other hand, design of the grousers must also take into account connection to the drive sprockets, which in practical terms means strengthening the structure.

SUMMARY

It is an object of the present disclosure to provide a snow groomer track and a snow groomer designed to eliminate drawbacks of certain known snow groomers, and which, in particular, provide for improving traction.

According to the present disclosure, there is provided a snow groomer track comprising a plurality of grousers extending crosswise to the traveling direction of the track and each having a grip portion for gripping the terrain, and a blunt edge opposite the grip portion, characterized by a chain connected to the blunt edges of the grousers so as to be engaged, in use, by a drive sprocket of a snow groomer.

According to a further aspect of the disclosure, the track comprises elastically deformable connectors for connecting the chain to the grousers in such a manner as to permit controlled relative rotation of the grousers with respect to the chain in a plane crosswise to the traveling direction of the track.

According to a further aspect of the disclosure, the chain comprises a plurality of links, and hinge connectors for hinge connecting pairs of adjacent links about respective hinge axes crosswise to the traveling direction of the track, and the hinge connectors are elastically deformable to permit controlled relative rotation of any two adjacent links about axes not coinciding with the respective hinge axis.

A drive sprocket of the snow groomer engages the chain of a respective track.

Additional features and advantages are described in, and will be apparent from, the following Detailed Description and the figures.

BRIEF DESCRIPTION OF THE DRAWINGS

A number of non-limiting embodiments of the present disclosure will be described by way of example with reference to the accompanying drawings, in which:

FIG. 5 shows a front view of a portion of a track in accordance with a second embodiment of the present disclosure.

DETAILED DESCRIPTION

Figure 1:
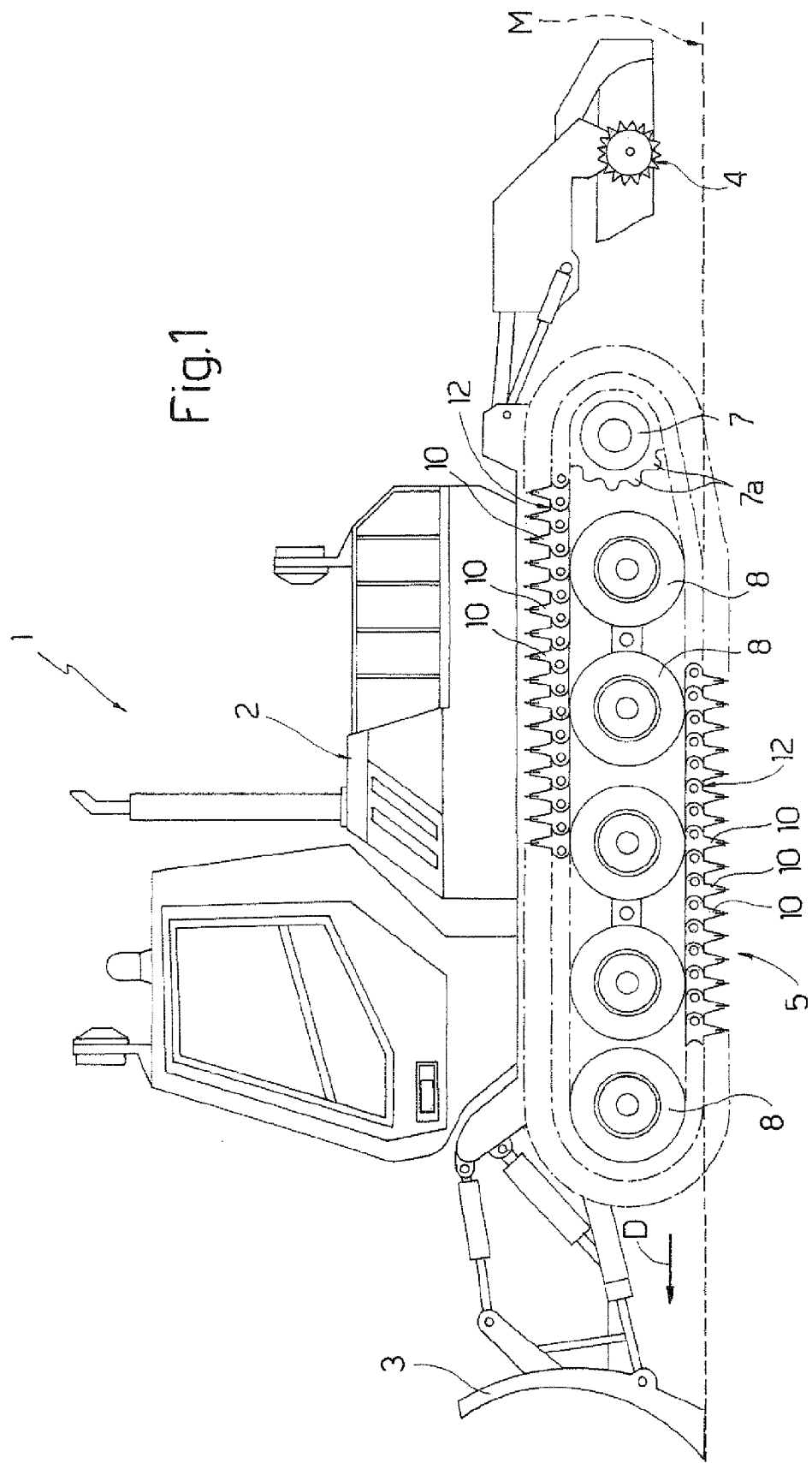
FIG. 1 shows a side view, with parts removed for clarity, of a snow groomer featuring a track in accordance with a first embodiment of the present disclosure.

Referring now to the example embodiments of the present disclosure illustrated in FIGS. 1 to 5, number 1 in FIG. 1 indicates as a whole a snow groomer comprising a frame 2; a front shovel 3; and an implement 4 for grooming the snow surface M of a ski slope. Implement 4 is connected to the rear of frame 2 to be drawn by groomer 1, and comprises, by way of example, a rotary snow tiller.

Snow groomer 1 comprises two tracks 5 (only one shown in FIG. 1) driven by respective drive sprockets 7 and guided by idle guide wheels 8 (four on each side of snow groomer 1 in the embodiment described).

Figure 2:
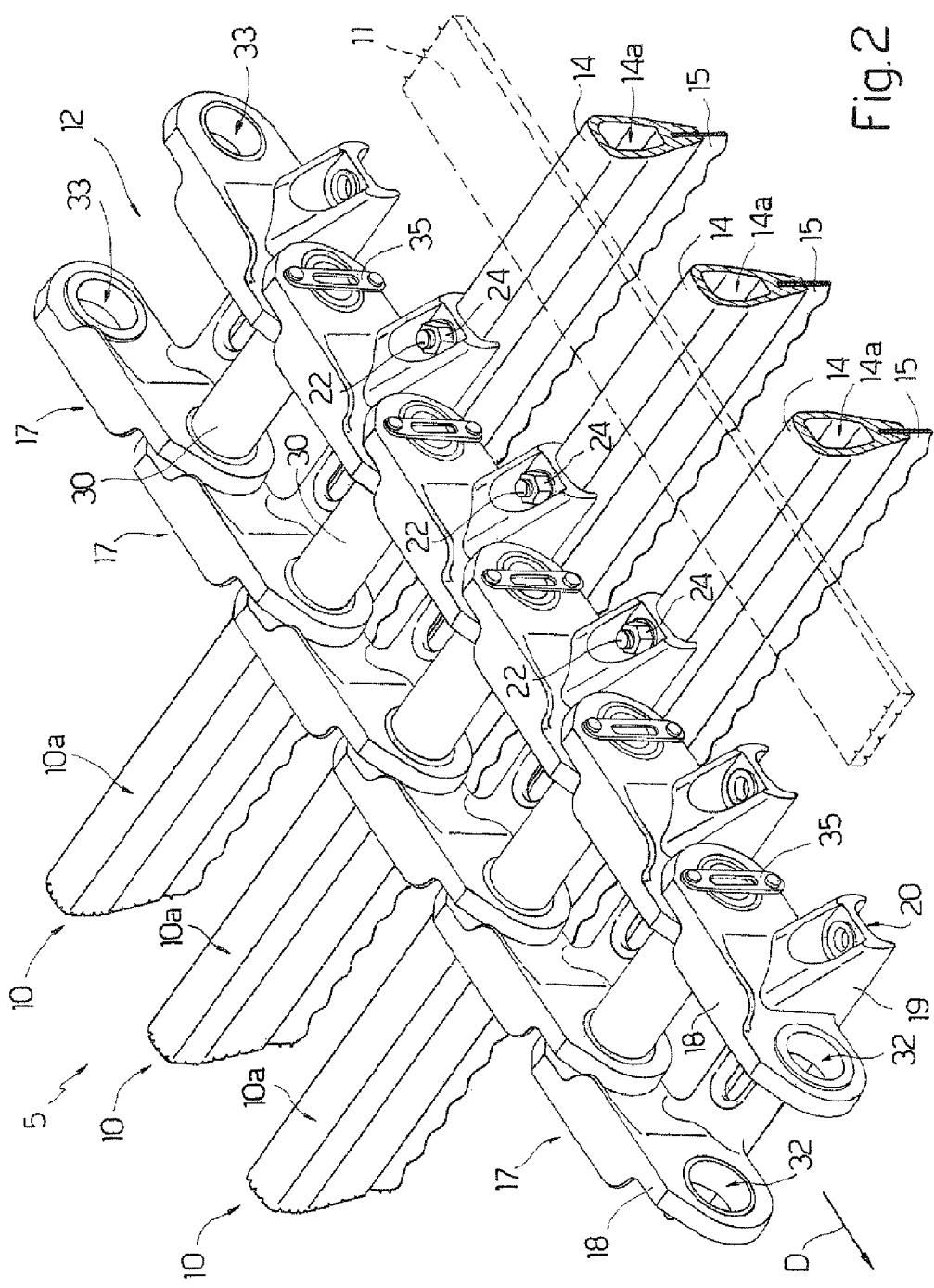
FIG. 2 shows a larger-scale, three-quarter top view in perspective of a portion of the FIG. 1 track.
Figure 3:
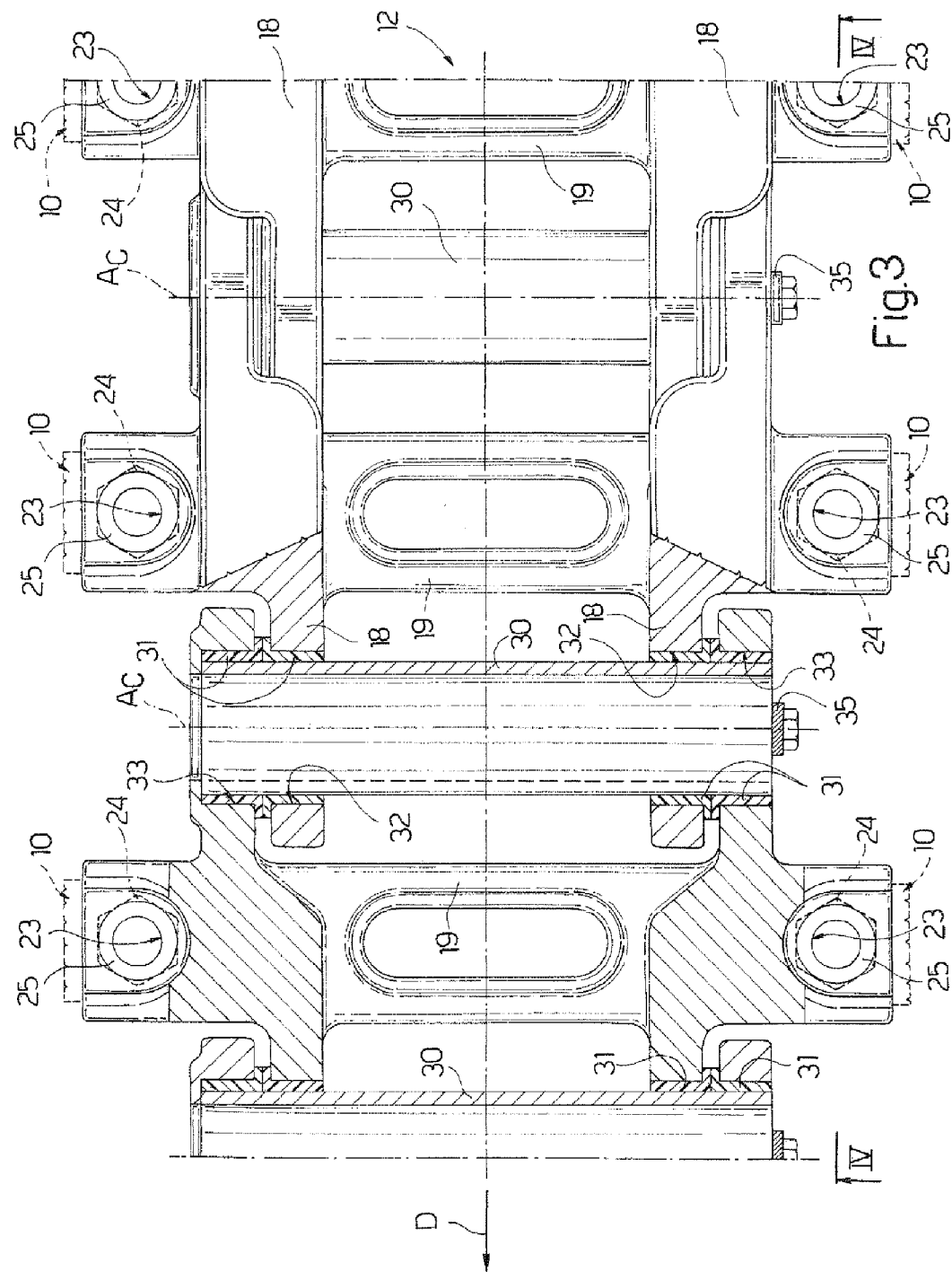
FIG. 3 shows a partly sectioned plan view of a portion of the FIG. 1 track.
Figure 4:
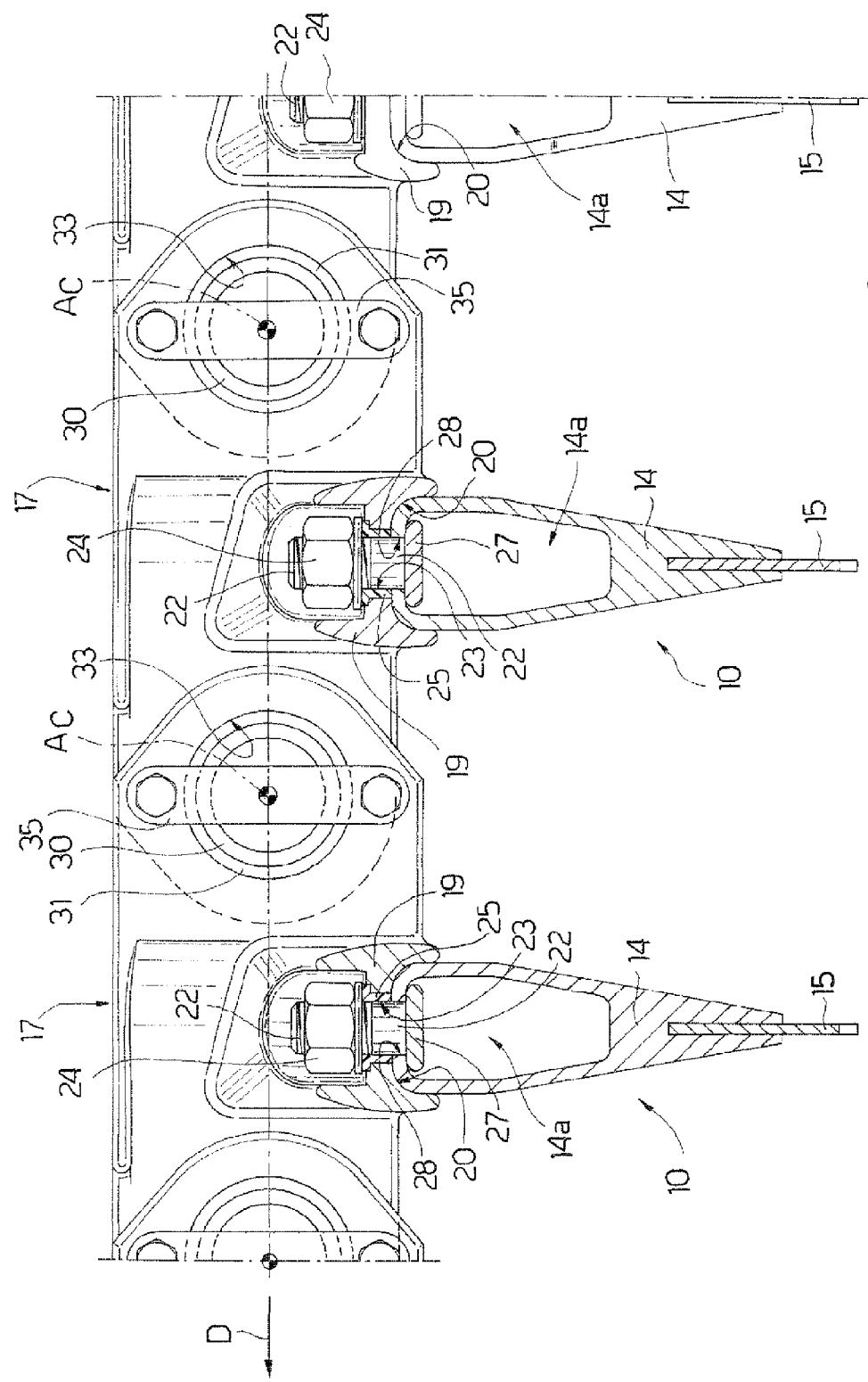
FIG. 4 shows a side view of the FIG. 3 track portion sectioned along line IV-IV in FIG. 3.

As shown in FIGS. 2, 3 and 4, track 5 comprises a plurality of transverse grip bars, hereinafter referred to as grousers 10, connected by one or more flexible belts 11, and a chain 12.

Grousers 10 are spaced apart in succession, extend crosswise to the traveling direction D of track 5, and each comprise a support bar 14 and a blade 15 which defines a grip portion that cuts into the terrain (in particular, snow surface M) to ensure grip of track 5. Blade 15 is welded or riveted to support bar 14. Support bar 14 has a longitudinal cavity 14a running through the entire longer dimension of grouser 10, crosswise to traveling direction D. A portion of support bar 14, opposite blade 15, defines a blunt edge 10a of grouser 10. Flexible belts 11 are fixed to blunt edges 10a of grousers 10 and one of flexible belts 11 serves as a support for guide wheels 8.

Chain 12 is connected to blunt edges 10a of grousers 10, crosswise to traveling direction D, as explained in detail below, so as to be engaged, in use, by a respective drive sprocket 7 of snow groomer 1 to transmit motion to track 5.

Chain 12 comprises a number of links 17 hinged to one another in pairs and connected to blunt edges 10a of respective grousers 10.

More specifically, each link 17 of chain 12 comprises two parallel bars 18 extending in traveling direction D of track 5 and connected by a crosspiece 19 perpendicular to them. Crosspiece 19 thus extends crosswise to traveling direction D of track 5, and comprises a seat shaped according to blunt edges 10a of grousers 10. Links 17 are connected to respective grousers 10 by elastically deformable connectors that permit controlled relative rotation of grousers 10 with respect to chain 12 in a plane crosswise to traveling direction D of track 5. In the embodiment described, the elastically deformable connectors comprise: threaded pins 22 projecting perpendicularly from blunt edge 10a of respective grousers 10 and inserted through fastening holes 23 in crosspiece 19 of a respective link 17 of chain 12, outwards of bars 18, nuts 24 fitted to respective threaded pins 22, and bushes 25 made of resilient material and housed inside fastening holes 23, about respective threaded pins 22. Threaded pins 22 of each grouser 10 are carried by a respective strip 27 housed inside longitudinal cavity 14a of grouser 10, and are fitted through openings 28 in blunt edge 10a of grouser 10. Bushes 25 are made, for example of rubber, deform when subjected to torque about axes not aligned with threaded pins 22, and return to the undeformed configuration when stress is removed.

Pairs of adjacent links 17 of chain 12 are hinged to each other, about respective hinge axes $A_C$ crosswise to traveling direction D of track 5, by elastically deformable hinge connectors to permit controlled relative rotation of any two adjacent links 17 about axes not coincident with respective hinge axis $A_C$.

The hinge connectors comprise connecting pins 30 between pairs of adjacent links 17, and hinge bushes 31 made of resilient material (e.g., rubber) and inserted between each link 17 of chain 12 and respective connecting pins 30.

More specifically, each bar 18 has a first hinge hole 32 at a first end, and a second hinge hole 33 at a second end. In each link 17, the second hinge hole 33 of the bar 18 on the side facing frame 2 of snow groomer 1 is a dead hole; and the second hinge hole 33 of the bar 18 on the outward-facing side is a through hole, as are first hinge holes 32.

First hinge holes 32 and second hinge holes 33 each house a respective hinge bush 31.

The first hinge holes 32 of each link 17 are aligned with the second hinge holes 33 of an adjacent link 17, and house a respective connecting pin 30 inside hinge bushes 31.

Connecting pins 30 define hinge axes $A_C$ and are each held in place between a wall of the dead second hole 33, and a plate 35 inserted through the through second hole 33.

In other words, each link 17 has a first end connected to an adjacent link 17 by a connecting pin 30 inserted inside first hinge holes 32; and a second end, opposite the first end, connected to a further adjacent link 17 by a further connecting pin 30 inserted inside second hinge holes 33.

Hinge bushes 31 allow articulated movements between each pair of adjacent links 17 about axes not coincident with respective hinge axes $A_C$, deform when subjected to torque about axes not aligned with respective hinge axes $A_C$, and return to the undeformed configuration when stress is removed.

The gap between each two adjacent connecting pins 30 defines a seat which is engaged by a tooth 7a of drive sprocket 7 connected to track 5.

In a different embodiment of the disclosure shown in FIG. 5, in addition to threaded pins 22 inserted inside respective fastening holes 23 and locked by nuts 24, the elastically deformable connectors comprise a strip 125 of resilient material (e.g., rubber) interposed between each grouser 10 and seat 20 of respective link 17 of chain 12.

Using the chain has the advantage of improving transmission of motion from the drive sprockets to the tracks, and so improving traction of the snow groomer. Moreover, the materials and construction characteristics of the grousers and chain can be selected independently, with no recourse to trade-offs which impair performance and resistance of the component parts. More specifically, the grousers are less subject to wear, thus prolonging the working life of the tracks. Another advantage lies in the modular design of both the grousers and the chain links, which means they can be replaced individually in the event of accidental damage or wear.

The elastically deformable connectors and hinge connectors enable optimum use of the chain on snow groomers in particular. Snow groomer tracks, in fact, are extremely wide, to enable the vehicle to float on soft, yielding terrain, such as snow. On the other hand, the large size of the tracks may result in potentially dangerous twisting and bending of the grousers at the join between the grousers and the chain links and between adjacent links. The elasticity of the connectors and hinge connectors, however, enables independent movement of the grousers and chain links, to adapt to uneven terrain, at least within given deformation limits and to the extent of slack allowed, thus greatly reducing stress.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A snow groomer track comprising:
   a plurality of spaced apart grousers extending crosswise to a traveling direction of the snow groomer track, each grouser having:
      a grip portion configured to grip a terrain, and
      a blunt edge opposite the grip portion;
   a chain connected to the blunt edges of the grousers, said chain configured to be engaged, in use, by a drive sprocket of a snow groomer; and
   a plurality of elastically deformable connectors configured to connect the chain to the grousers to permit controlled relative rotation of the grousers with respect to the chain in a plane crosswise to the traveling direction of the snow groomer track.

2. The snow groomer track of claim 1, wherein the elastically deformable connectors include:
   a plurality of threaded pins projecting from the blunt edges of respective grousers and inserted through a plurality of respective fastening holes in the chain;
   a plurality of nuts fitted to respective threaded pins; and
   a plurality of first bushes of resilient material, housed in the fastening holes, about the respective threaded pins.

3. The snow groomer track of claim 1, wherein the elastically deformable connectors include a plurality of strips of resilient material, each interposed between a respective grouser and a respective connecting portion of the chain.

4. The snow groomer track of claim 1, wherein the chain includes a plurality of links, and a plurality of hinge connectors configured to hinge connect pairs of adjacent links about a respective hinge axes crosswise to the traveling direction of the snow groomer track, said hinge connectors are elastically deformable to permit controlled relative rotation of any two adjacent links about a plurality of axes not coincident with the respective hinge axis of said two adjacent links.

5. The snow groomer track of claim 4, wherein each of the hinge connectors includes a connecting pin between pairs of adjacent links in the chain and a hinge bush of resilient material inserted between each link in the chain and the connecting pin.

6. The snow groomer track of claim 5, wherein each link includes at least a first and second hinge hole at opposite ends in the traveling direction of the snow groomer track, and each link has a first end connected to a first adjacent link by a first connecting pin inserted inside the first hinge hole, and a second end opposite the first end and connected to a second adjacent link by a second connecting pin inserted inside the second hinge hole.

7. The snow groomer track of claim 6, wherein the first hinge holes and the second hinge holes of each link house respective hinge bushes.

8. The snow groomer track of claim 4, wherein each link is connected to a respective grouser, and has a seat conformal in shape to the blunt edges of the grousers.

9. The snow groomer track of claim 1, wherein each grouser includes:
   a support bar defining the blunt edge of the grouser and fixed to the chain crosswise to the traveling direction of the snow groomer track; and
   a blade fitted to the support bar on the opposite side to the blunt edge and defining the grip portion of the grouser.

10. The snow groomer track of claim 1, which includes at least one flexible belt connecting the grousers to one another.

11. A snow groomer comprising:
   a snow groomer track including:
      a plurality of spaced apart grousers extending crosswise to a traveling direction of the snow groomer track, each grouser having a grip portion configured to grip a terrain, and a blunt edge opposite the grip portion;
      a chain connected to the blunt edges of the grousers, said chain configured to be engaged, in use, by a drive sprocket of a snow groomer; and
      a plurality of elastically deformable connectors configured to connect the chain to the grousers to permit controlled relative rotation of the grousers with respect to the chain in a plane crosswise to the traveling direction of the snow groomer track.

12. The snow groomer of claim 11, including at least one drive sprocket engaging the chain of said snow groomer track.

13. A snow groomer track comprising:
   a plurality of spaced apart grousers having a plurality of respective longitudinal cavities and extending crosswise to a traveling direction of the snow groomer track, each grouser having:
      a grip portion configured to grip a terrain, and
      a blunt edge opposite the grip portion;
   a chain connected to the blunt edges of the grousers, said chain configured to be engaged, in use, by a drive sprocket of a snow groomer; and
   a plurality of elastically deformable connectors configured to connect the chain to the grousers to permit controlled relative rotation of the grousers with respect to the chain in a plane crosswise to the traveling direction of the snow groomer track, wherein the elastically deformable connectors include:
      a plurality of threaded pins projecting from the blunt edges of respective grousers and inserted through a plurality of respective fastening holes in the chain, the threaded pins of each grouser being carried by a respective strip housed inside the longitudinal cavity of the grouser, and being inserted through at least one opening formed in the blunt edge of the grouser,
      a plurality of nuts fitted to respective threaded pins, and
      a plurality of first bushes of resilient material, housed in the fastening holes, about the respective threaded pins.

14. A snow groomer track comprising:
   a plurality of spaced apart grousers extending crosswise to a traveling direction of the snow groomer track, each grouser having:
      a grip portion configured to grip a terrain, and
      a blunt edge opposite the grip portion; and
   a chain connected to the blunt edges of the grousers, said chain including a plurality of links, and a plurality of hinge connectors configured to hinge connect pairs of adjacent links about a respective hinge axes crosswise to the traveling direction of the snow groomer track, said hinge connectors are elastically deformable to permit controlled relative rotation of any two adjacent links about a plurality of axes not coincident with the respective hinge axis of said two adjacent links and each of the hinge connectors including a connecting pin between pairs of adjacent links in the chain and a hinge bush of resilient material inserted between each link in the chain and the connecting pin, said chain configured to be engaged, in use, by a drive sprocket of a snow groomer.

15. The snow groomer track of claim 14, wherein each link includes at least a first and second hinge hole at opposite ends in the traveling direction of the snow groomer track, and each link has a first end connected to a first adjacent link by a first connecting pin inserted inside the first hinge hole, and a second end opposite the first end and connected to a second adjacent link by a second connecting pin inserted inside the second hinge hole.

16. The snow groomer track of claim 15, wherein the first hinge holes and the second hinge holes of each link house respective hinge bushes.

* * * * *